United States Patent
Yu et al.

(10) Patent No.: US 8,315,552 B2
(45) Date of Patent: Nov. 20, 2012

(54) BODY INTERACTIVELY LEARNING METHOD AND APPARATUS

(75) Inventors: Hung-Hsiu Yu, Changhua County (TW); Ching-Yi Liu, Taichung County (TW); Wei-Han Wang, Taipei County (TW); Chiu-Sheng Tseng, Taipei County (TW)

(73) Assignees: Industrial Technology Research Institute, Hsin-Chu (TW); Mei-Fang Chu, Taipei County (TW); Chiu-Sheng Tseng, Taipei County (TW)

( * ) Notice: Subject to any disclaimer, the term of this patent is extended or adjusted under 35 U.S.C. 154(b) by 1146 days.

(21) Appl. No.: 12/032,272

(22) Filed: Feb. 15, 2008

(65) Prior Publication Data

US 2009/0170057 A1    Jul. 2, 2009

(30) Foreign Application Priority Data

Dec. 31, 2007    (TW) .............................. 96151391 A

(51) Int. Cl.
*G09B 5/04* (2006.01)
(52) U.S. Cl. ........................ 434/321; 434/319
(58) Field of Classification Search ........... 434/308–321
See application file for complete search history.

(56) References Cited

U.S. PATENT DOCUMENTS

| | | | |
|---|---|---|---|
| 4,556,799 A * | 12/1985 | Rolando | ................ 250/577 |
| 5,223,658 A | 6/1993 | Suzuki | |
| 6,843,726 B1 * | 1/2005 | Nomi et al. | ................ 463/43 |
| 2007/0049374 A1 | 3/2007 | Ikeda et al. | |

FOREIGN PATENT DOCUMENTS

| | | |
|---|---|---|
| CN | 1618400 | 5/2005 |
| CN | 1728276 | 2/2006 |
| EP | 0489576 A2 | 6/1992 |
| EP | 0509766 A2 | 10/1992 |

(Continued)

OTHER PUBLICATIONS http://www.youtube.com/watch?v=46DOpVNhNn8 DJ Wiij—First Glance by vinyljelly Feb. 2007.*

(Continued)

*Primary Examiner* — Xuan Thai
*Assistant Examiner* — Evan Page
(74) *Attorney, Agent, or Firm* — WPAT PC; Justin King

(57) ABSTRACT

A body interactively learning method is disclosed, which comprises the steps of: turning on the power of a body interactively learning apparatus while selecting an operation mode for the same; attaching a motion sensor of the body interactively learning apparatus onto body of a user; using the motion sensor to detect vibrations of the body and consequently sending the detected vibration signals to a processing unit; enabling the processing unit to perform an evaluation for determining whether the vibration signals are valid. With the aforesaid method and apparatus, the user is able to use the valid vibration signals to control a proceeding of an audio/video content that is stored in a data storage unit of the apparatus selected from the group consisting of: playing the audio/video content, pausing the playing of the audio/video content, recording the audio/video content, setting pause points in the audio/video content, searching the pause point of the audio/video content, and changing playing speed of the audio/video content, and responding interactively to the audio/video content. In an exemplary embodiment, the user can either stop the playing of the audio/video content by pressing a stop button of the apparatus or by moving his/her body to generate a specific vibration signal.

26 Claims, 9 Drawing Sheets

FOREIGN PATENT DOCUMENTS

| EP | 0545635 A2 | 6/1993 |
|---|---|---|
| WO | 9503588 | 2/1995 |

OTHER PUBLICATIONS http://web.archive.org/web/20070205153017/http://www.djwiij.com/home.html www.djwiij.com Feb. 2007.* http://web.archive.org/web/20061213193604/http://en.wikipedia.org/wiki/Wii_Remote#Nunchuk wikipedia.org Dec. 2006.* http://youtube.com/watch?v=46DOpVNhNn8, Feb. 1, 2007 "The Art of Wiijing" presented by DJ (DJ Wiij).

http://en.wikipedia.org/wiki/Wii_remote, Apr. 21, 2006 [2. Design], [3.2 Controller feedback].

http://www.djwiij.com/index.php?option=com_content&task=view&id=55&Itemid=71—WiiJing is Wireless DJing!.

Taiwan Patent Office Action issued on Oct. 20, 2011.

Wii Operations Maunal (http://www.nintendo.com/consumer/downloads/WiiOpMn_setup.pdf).

* cited by examiner

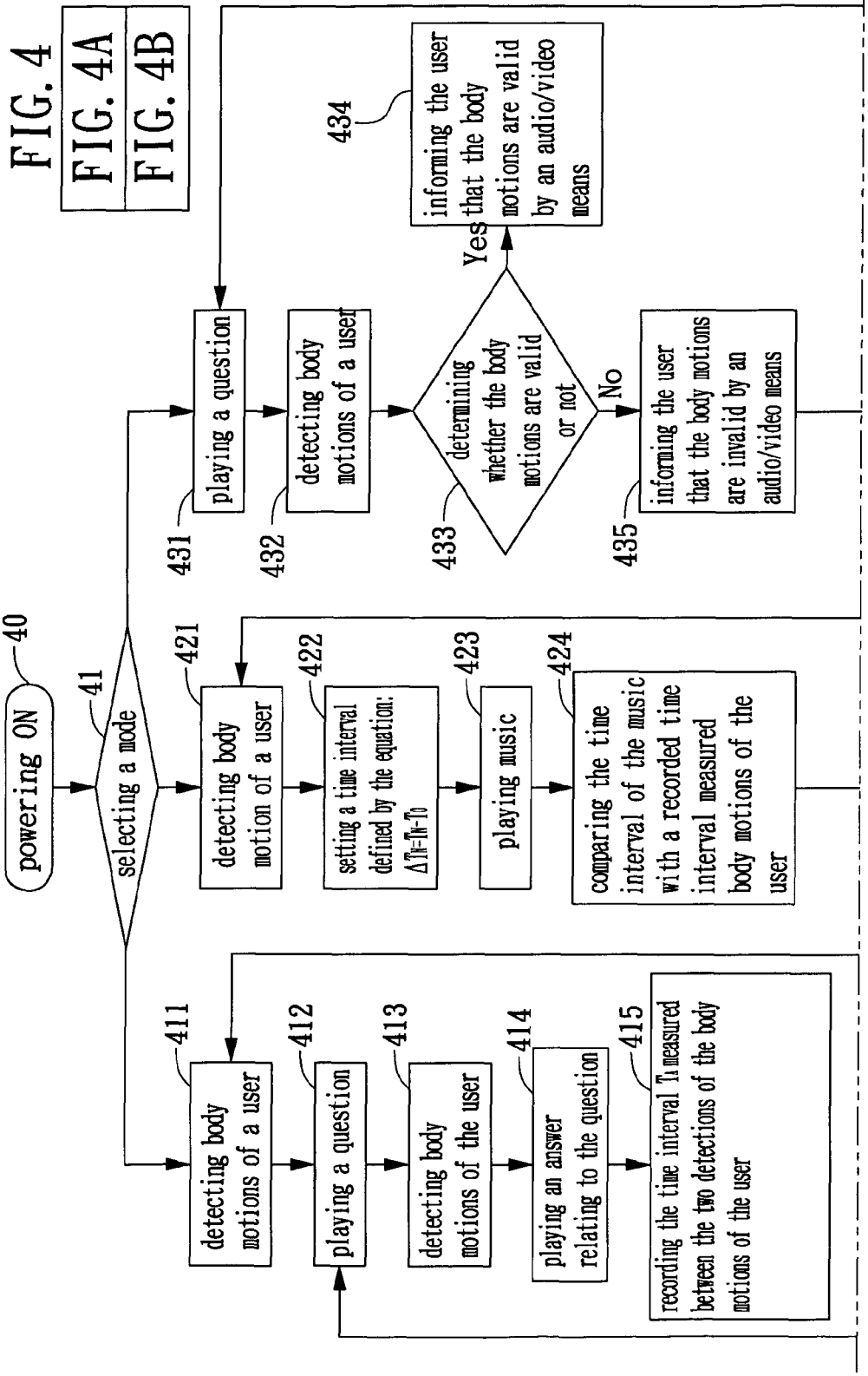

BODY INTERACTIVELY LEARNING METHOD AND APPARATUS

FIELD OF THE INVENTION

The present invention relates to a body interactively learning method and apparatus, and more particularly, to a method capable of enabling a user to select a learning mode and learning knowledge with body movements while promoting his/her learning efficiency by virtual reality interaction and body motion.

BACKGROUND OF THE INVENTION

It is not easy to learn a new language or musical skill since most people do not have a good learning environment for enhancing one's learning efficiency. Learning is the acquisition and development of memories and behaviors that can be conceived as the product of experience. In psychology, habituation is an example of human learning process in which there is a progressive diminution of behavioral response probability with repetition of a stimulus. For instance, by getting used to a language through listening to it all the time is the way how we learn our first language, i.e. our mother tongue. In fact, language is the expression of human communication through a series of patterns which includes systematic, conventionally used signs, sounds, gestures, or marks that convey understood meanings within a group or community. It is required for a person to hear and practice such patterns in a repetitive manner so as to master the language. However, learning a foreign language can be a frustrating task since most people simply do not have the luxury of living in a foreign-language-speaking environment or having a foreigner to repeat a phrase again and again. In that case, those language learning machines currently available on the market will be our second best choice for learning foreign language.

Most of those language learning machines currently available on the market are almost identical in most respects, such as playing audio files, playing musical files, playing a particular segment of the playback repeatedly, adjusting playing speed, performing a test, and so on. It is noted that a student playing a learn-teaching material on one of the aforesaid conventional language learning machines can only stop, pause or repeat the playing of the learn-teaching material, but is not able to change the designed learning tempo of the learn-teaching material, so that the learning efficiency can be adversely affected as the learning tempo of the student may not match with the designed learning tempo of the learn-teaching material.

SUMMARY OF THE INVENTION

The object of the present invention is to provide a body interactively learning method and apparatus capable of enabling a user to select a learning mode and learning knowledge with body movements while promoting his/her learning efficiency by virtual reality interaction and body motion.

To achieve the above object, the present invention provide a body interactively learning method, comprising the steps of:
(A) turning on the power of a body interactively learning apparatus while selecting an operation mode for the same;
(B) attaching a motion sensor of the body interactively learning apparatus onto body of a user;
(C) using the motion sensor to detect vibrations of the body and consequently sending the detected vibration signals to a processing unit;
(D) enabling the processing unit to perform an evaluation for determining whether the vibration signals are valid; if so, the flow proceeds top step (E); otherwise, the flow proceeds back to step (C);
(E) enabling the user to use the valid vibration signals for controlling a proceeding of an audio/video content that is stored in a data storage unit of the apparatus selected from the group consisting of: playing the audio/video content, pausing the playing of the audio/video content, recording the audio/video content, setting pause points in the audio/video content, searching the pause point of the audio/video content, changing playing speed of the audio/video content, and responding interactively to the audio/video content;
(F) determining whether the user goes back to step (C) or stops the playing of the audio/video content by performing an action selected from the group consisting of: pressing a stop button of the body interactively learning apparatus, and moving his/her body to generate a specific vibration signal indicating stop playing; and
(G) ending.

In an exemplary embodiment, the present invention provides a method utilizing a body interactively learning apparatus for learning a language, which comprises the steps of:
(A1) turning on the power of a body interactively learning apparatus while attaching a motion sensor of the body interactively learning apparatus onto body of a user;
(A2) selecting an operating mode;
(A3) detecting body motions of the user;
(A4) playing a question;
(A5) detecting body motions of the user;
(A6) playing an answer relating to the question;
(A7) recording the time interval $T_A$ measured between the two detections of the body motions of the user;
(A8) determining whether to repeat the aforesaid question; if so, the flow proceeds back to the step (A4); otherwise, the flow proceeds to step (A9);
(A9) selecting a playing speed according to the time interval $T_A$, i.e. enabling the user to control the tempo of an audio/video content playing on the body interactively learning apparatus by adjusting the tempo of his/her body motions;
(A10) updating the question;
(A11) determining whether the user stops the playing by performing an action selected from the group consisting of: pressing a stop button of the body interactively learning apparatus, and moving his/her body to generate a specific vibration signal indicating stop playing; if so, the flow proceeds to step (A12); otherwise, the flow proceeds back to the step (A3) so as to get ready to play the updated question according to the playing speed selected from the step (A9); and
(A12) ending.

In another exemplary embodiment, the present invention provides a method utilizing a body interactively learning apparatus for learning music which comprises the steps of:
(B1) turning on the power of a body interactively learning apparatus while attaching a motion sensor of the body interactively learning apparatus onto body of a user;
(B2) selecting an operating mode;
(B3) detecting body motions of the user;
(B4) setting up a time interval of music;
(B5) playing music;
(B6) comparing the time interval of music with a recorded time interval measured by detecting body motions of the user;

(B7) making an evaluation to determining whether one of the following condition is happened: the music is over, and the user stops the playing of the music by pressing a stop button of the body interactively learning apparatus or by moving his/her body to generate a specific vibration signal; if so, the flow proceeds to step (B8); otherwise, the flow proceeds back to step (B3);

(B8) calculating an error rate according to the comparison executed in the step (B6); and (B9) displaying the error rate.

In further another exemplary embodiment, the present invention provides an interactive Q&A learning method utilizing a body interactively learning apparatus, which comprises the steps of:

(C1) turning on the power of a body interactively learning apparatus while attaching a motion sensor of the body interactively learning apparatus onto body of a user;

(C2) selecting an operating mode;

(C3) playing a question;

(C4) detecting body motions of a user;

(C5) determining whether the body motions corresponding to the question are valid or not; if so, the flow proceeds to step (C6); otherwise, the flow proceeds back to step (C7);

(C6) informing the user that the body motions corresponding to the question are valid by an audio/video means and then directing the flow to proceed to step (C9);

(C7) informing the user that the body motions corresponding to the question are invalid by an audio/video means and then directing the flow to proceed to step (C8);

(C8) displaying the correct answer of the aforesaid question;

(C9) updating the question;

(C10) determining whether the user stops the playing by performing an action selected from the group consisting of: pressing a stop button of the body interactively learning apparatus, and moving his/her body to generate a specific vibration signal indicating stop playing; if so, the flow proceeds to step (C11); otherwise, the flow proceeds back to the step (C3) so as to get ready to play the updated question; and (C11) ending Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention and wherein.

DESCRIPTION OF THE EXEMPLARY EMBODIMENTS

For your esteemed members of reviewing committee to further understand and recognize the fulfilled functions and structural characteristics of the invention, several exemplary embodiments cooperating with detailed description are presented as the follows.

Figure 1:
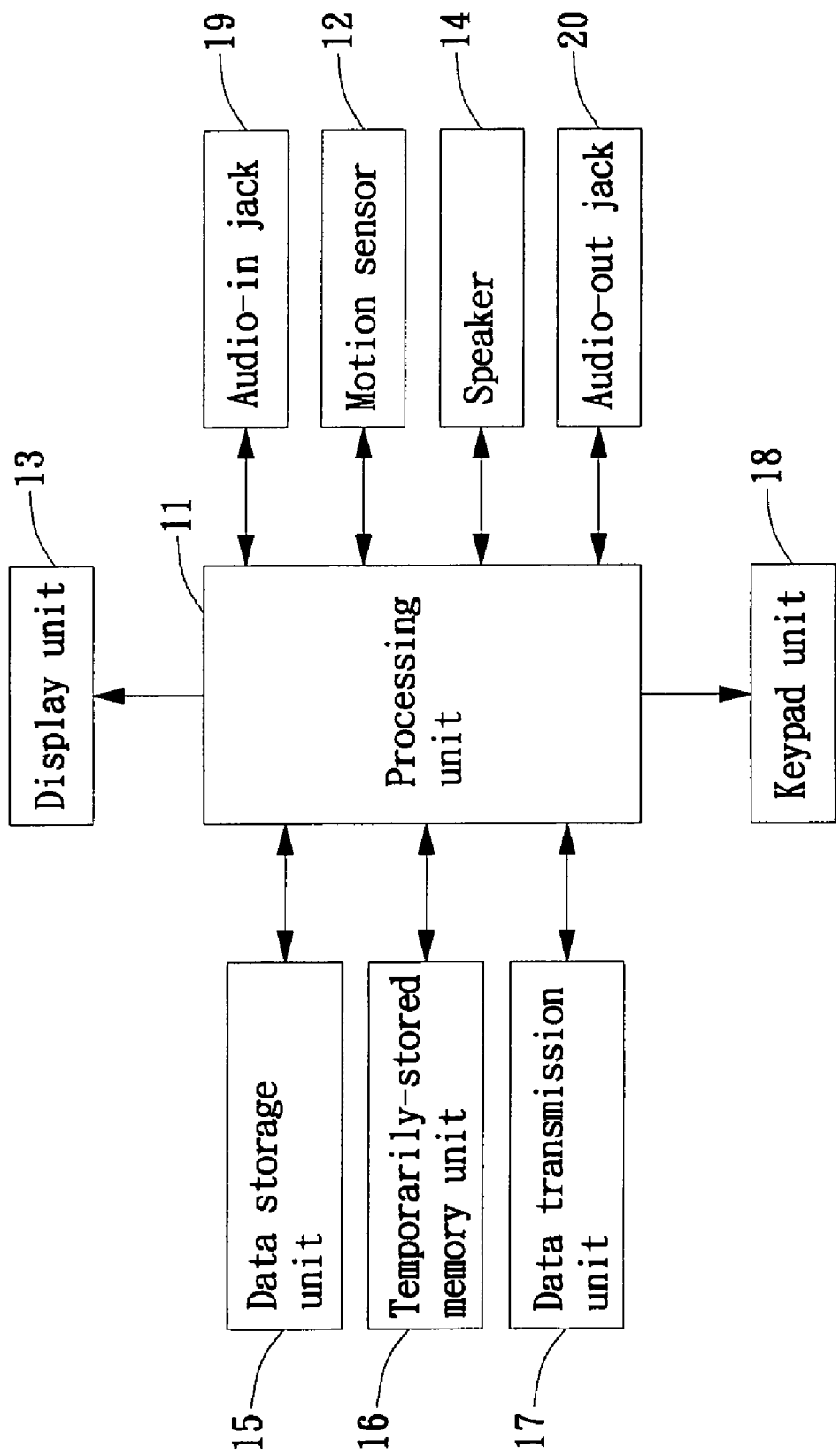
FIG. 1 is a block diagram depicting a body interactively learning apparatus of the invention.

Please refer to FIG. 1, which is a block diagram depicting a body interactively learning apparatus of the invention. The body interactively learning apparatus of FIG. 1 comprises: a processing unit 11, a motion sensor 12, a display unit 13, a speaker 14, a data storage unit 15, a temporary-stored memory unit 16, a data transmission unit 17, a keypad unit 18, an audio-in jack 19, and an audio-out jack 20. The display unit 13 is used for displaying information relating to an audio/video content playing on the body interactively learning apparatus. The motion sensor 12 is used for detecting a body motion of a user and thus transmitting a corresponding vibration signal to the processing unit 11 for analysis. The keypad unit 18 is provided for the user to control the operation of the body interactively learning apparatus, which is comprised of: a play/pause key, a power key, a repeat key, a record key and fast-forward/fast-backward key, and so on. In an exemplary embodiment, the keypad unit 18 can further include a function key provided for the user to select an operation mode for the body interactively learning apparatus, i.e. to enable the body interactively learning apparatus to enter a language-learning mode, a music-learning mode or a quiz-show mode. It is known to those skilled in the art that there can be other keys and functions being configured in the keypad unit 18 and thus the keypad unit 18 is not limited by the aforesaid keys. The audio-in jack 19 and the audio-out jack 20 are interfaces for audio input and output. The processing unit 11 is used for analyzing the vibration signals, executing multi-media information processing and data communication. The data storage unit 15 is used for storing data relating to each and every operation mode of the body interactively learning apparatus. The temporary-stored memory unit 16 acts as a buffer for temporary registering data. The data transmission unit 17 is substantially a connection interface for data exchanging, which can be a USB interface but is not limited thereby. For example, for wireless communication, the data transmission unit 17 is a connector selected from the group consisting of: a connector with Bluetooth interface, a connector with Zigbee interface, a connector with infrared communication interface, a connector with a communication interface defined by IEEE 802.11 protocol, a connector with a communication interface defined by WiFi protocol. In addition, for wired communication, the data transmission unit 17 is a connector selected from the group consisting of: a connector with USB communication interface and a connector with IEEE 1394 communication interface. Moreover, the speaker 14 is provided for outputting alerting sound or acting as an audio output.

Figure 2B:
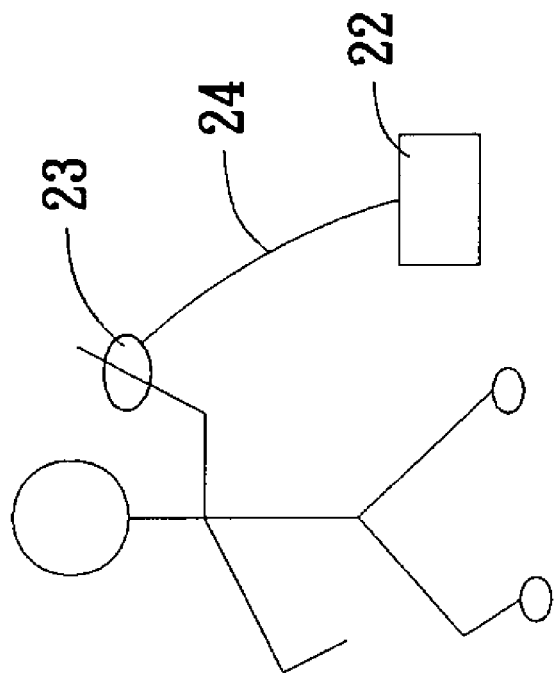
FIG. 2B is a schematic diagram showing an operating body interactively learning apparatus according to a second exemplary embodiment of the invention.
Figure 2A:
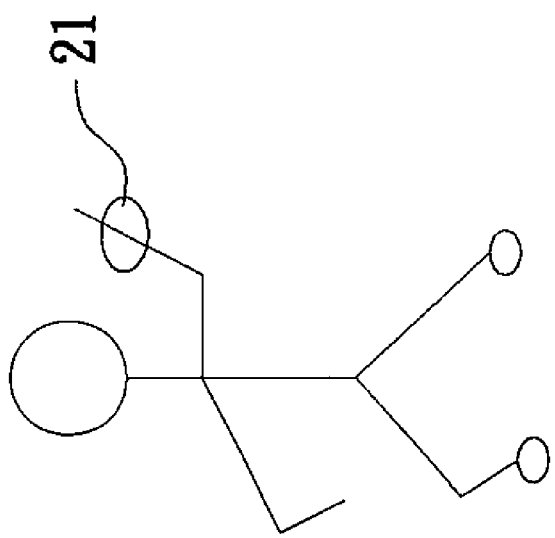
FIG. 2A is a schematic diagram showing a body interactively learning apparatus according to a first exemplary embodiment of the invention.

Please refer to FIG. 2A, which is a schematic diagram showing an operating body interactively learning apparatus according to a first exemplary embodiment of the invention. In FIG. 2A, the motion sensor is configured inside the body interactively learning apparatus 21 while the body interactively learning apparatus 21 is formed in a shape suitable to be attached to a user's body at position such as hands, arms, legs, waist and head, etc. Thereby, when the user moves his/her hands, arms, or legs, or swings his/her waist or head, the motion sensor is going to move accordingly for generating a corresponding vibration signal.

Please refer to FIG. 2B, which is a schematic diagram showing another operating body interactively learning apparatus according to a second exemplary embodiment of the invention. In FIG. 2B, the motion sensor 23 is connected to the body interactively learning apparatus 22 by a wire 24, by that the motion sensor 23 is designed for enabling the same suitable to be attached to a user's body at position such as hands, arms, legs, waist and head, etc. Thereby, when the user moves his/her hands, arms or legs, or swings his/her waist or head, the motion sensor 23 is going to move accordingly for generating a corresponding vibration signal while transmitting the vibration signal to the body interactively learning apparatus 22 through the wire 24. It is known to those skilled in the art that the aforesaid wired communication between the motion sensor 23 and the body interactively learning apparatus 22 can be replaced by other wireless communication means, such as a radio frequency device or Bluetooth device, and so on.

Figure 2C:
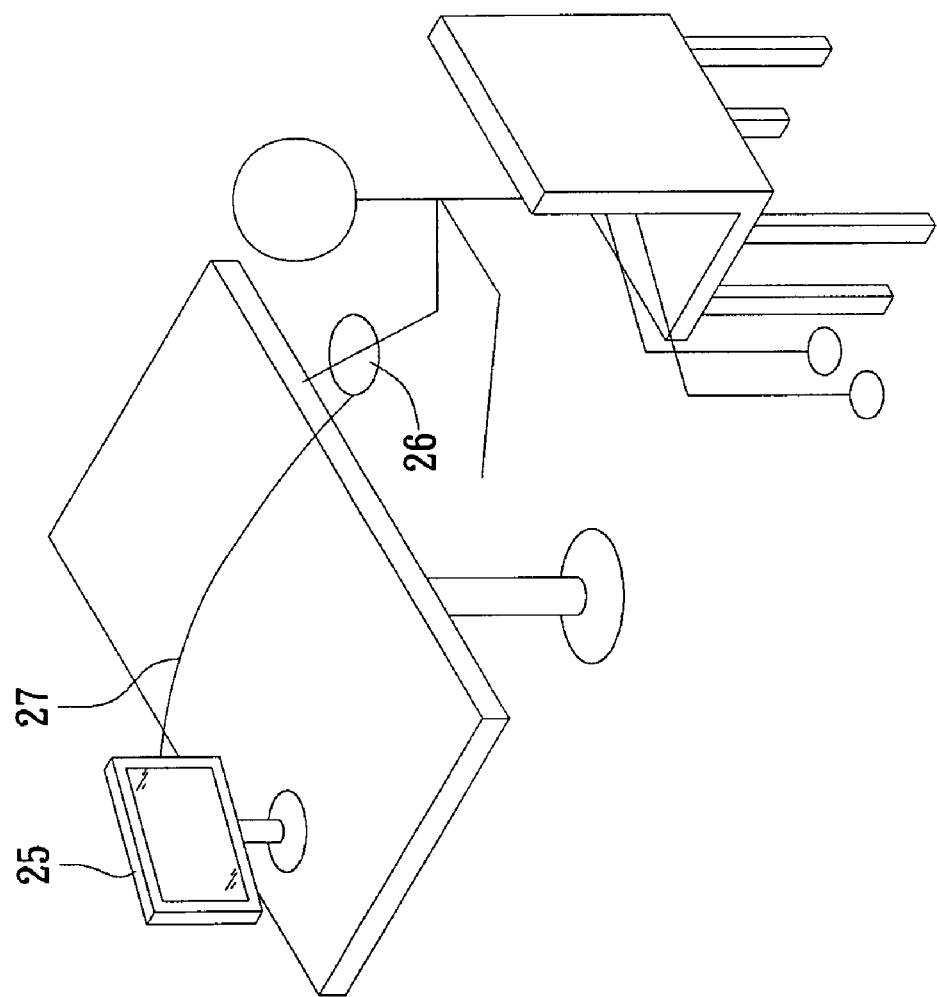
FIG. 2C is a schematic diagram showing yet another operating body interactively learning apparatus according to a third exemplary embodiment of the invention.

Please refer to FIG. 2C, which is a schematic diagram showing yet another operating body interactively learning apparatus according to a third exemplary embodiment of the invention. In FIG. 2C, the motion sensor 26 is connected to the body interactively learning apparatus 25 by a wire 27, by that the motion sensor 26 is designed for enabling the same suitable to be attached to a user's body at position such as hands, arms, legs, waist and head, etc., while the body interactively learning apparatus 25 is substantially a liquid crystal display (LCD) device having all the components mentioned in FIG. 1 to be configured therein. Thus, when the user performs a movement either by moving his/her hands or arms or legs or by swing his/her waist or head in response to an image or question displayed on the LCD device, the motion sensor 26 is going to move accordingly for generating a corresponding vibration signal while transmitting the vibration signal to the body interactively learning apparatus 25 through the wire 27. Similarly, it is known to those skilled in the art that the aforesaid wired communication between the motion sensor 23 and the body interactively learning apparatus 22 can be replaced by other wireless communication means, such as a radio frequency device or Bluetooth device, and so on.

Figure 3:
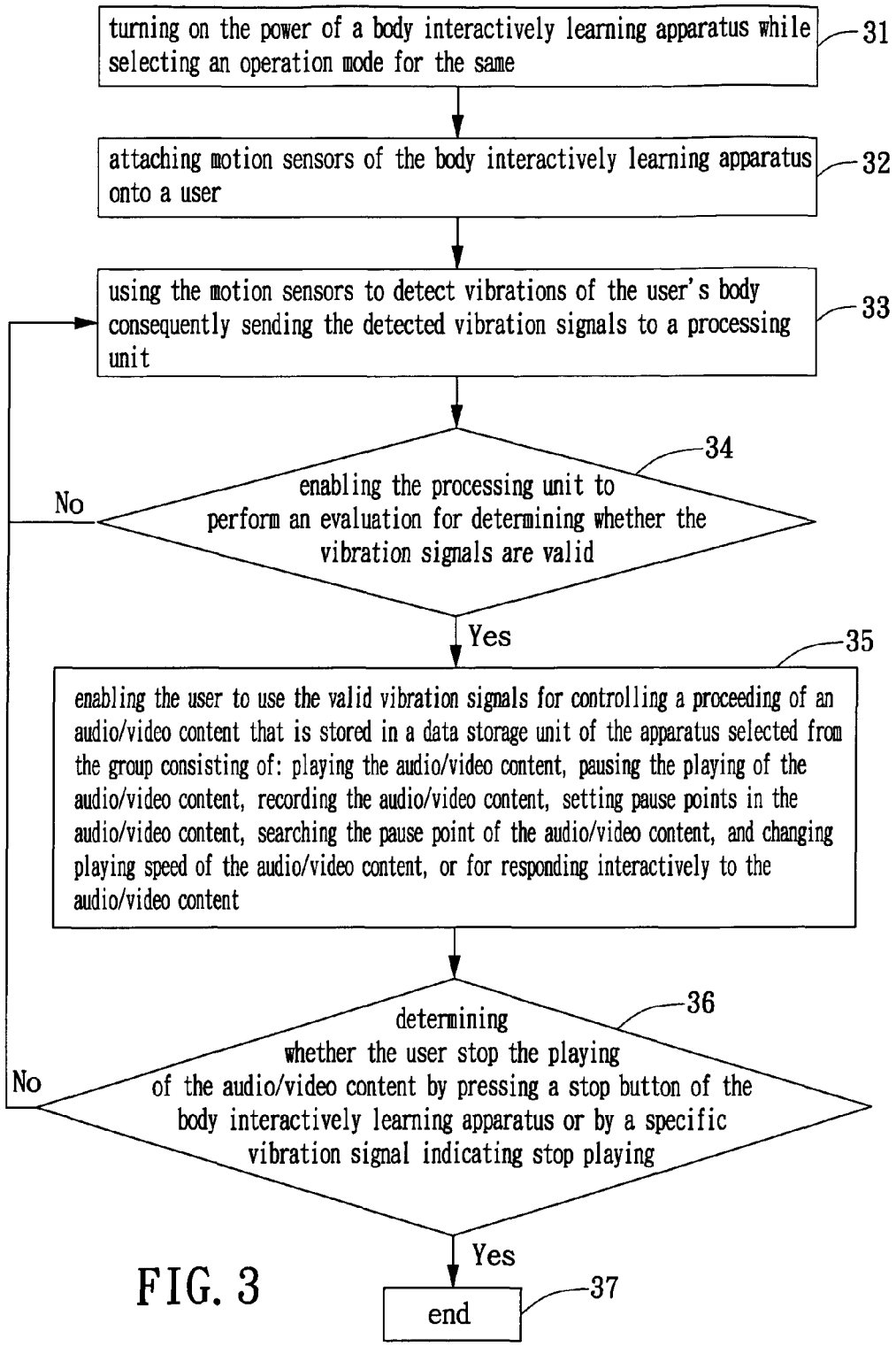
FIG. 3 is a flow chart depicting steps of a body interactively learning method of the invention.

Please refer to FIG. 3, which is a flow chart depicting steps of a body interactively learning method of the invention. The body interactively learning method of FIG. 3 comprises the steps of:

Step 31: turning on the power of a body interactively learning apparatus while selecting an operation mode for the same;

Step 32: attaching a motion sensor of the body interactively learning apparatus onto body of a user;

Step 33: using the motion sensor to detect vibrations of the body and consequently sending the detected vibration signals to a processing unit;

Step 34: enabling the processing unit to perform an evaluation for determining whether the vibration signals are valid; if so, the flow proceeds top step (35); otherwise, the flow proceeds back to step (33);

Step 35: enabling the user to use the valid vibration signals for controlling a proceeding of an audio/video content that is stored in a data storage unit of the apparatus selected from the group consisting of: playing the audio/video content, pausing the playing of the audio/video content, recording the audio/video content, setting a pause point in the audio/video content, searching the pause point of the audio/video content, changing playing speed of the audio/video content, and responding interactively to the audio/video content;

Step 36: determining whether the user goes back to the step (33) or stops the playing of the audio/video content by performing an action selected from the group consisting of: pressing a stop button of the body interactively learning apparatus, and moving his/her body to generate a specific vibration signal indicating stop playing; and Step 37: ending.

The abovementioned steps only illustrate a general algorithm of the body interactively learning method, that it is to be detailed in the following exemplary embodiments with reference to their corresponding figures.

First Exemplary Embodiment

Figure 4B:
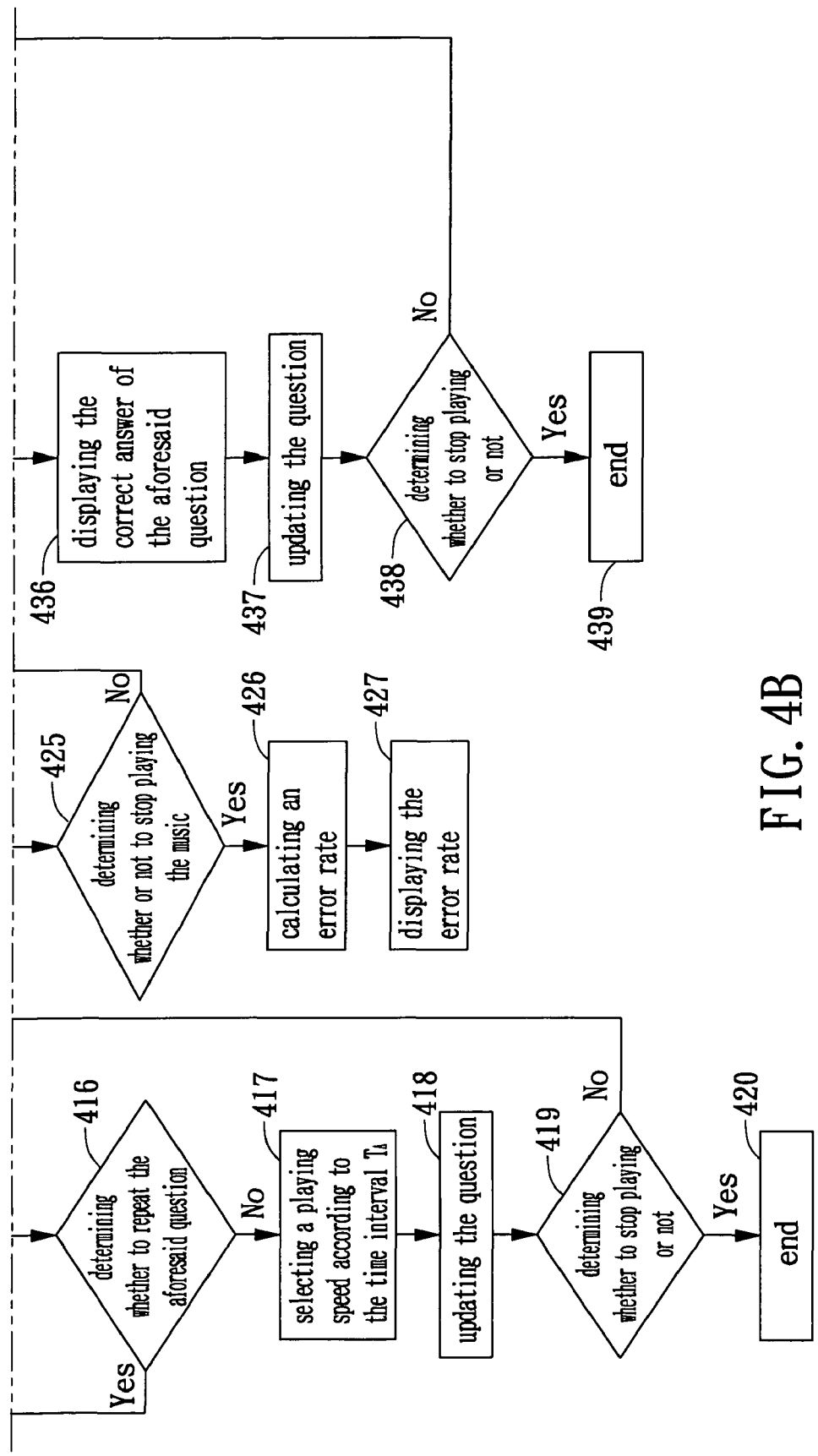
FIG. 4 is a flow chart depicting steps of a body interactively learning method of the invention for adapted a body interactively learning apparatus to different learning tasks.
Figure 5:
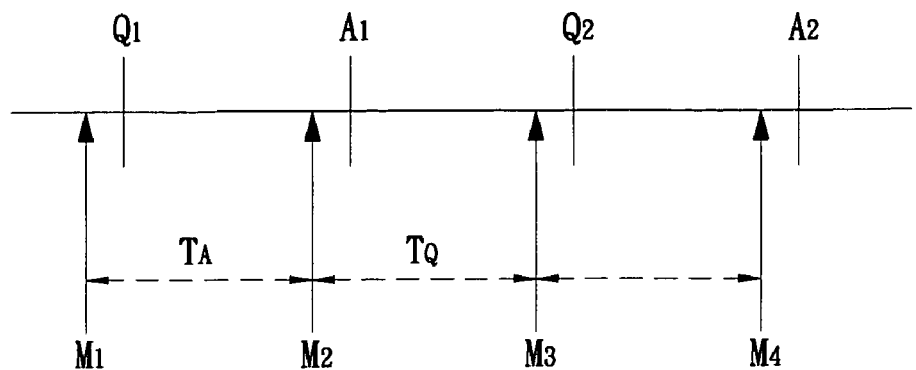
FIG. 5 is a schematic diagram showing the setup of timing used in a body interactively learning method for language learning according to an exemplary embodiment of the invention.

With reference to FIG. 1, FIG. 4, and FIG. 5, when the processing unit 11 of FIG. 1 received an electric signal from the keypad unit 18, it is going to select an operation mode from the temporary-stored memory unit 16 in correspondence to the electric signal. In this embodiment, the selection of the operation mode executed in the step 41 of FIG. 4 will direct the proceeding of FIG. 4 to the sub-proceeding starting from the step 411. Such sub-proceeding can be considered as an language learning proceeding which includes the steps of: step 40: powering ON; step 41: selecting a mode; step 411: detecting body motions of a user; step 412: playing a question; step 413: detecting body motions of the user; step 414: playing the answer relating to the question; step 415: recording the time interval $T_A$ between the playing of the question and the playing of the answer; step 416: determining whether to repeat the aforesaid question; step 417: selecting a playing speed according to the time interval $T_A$; step 418: updating the question; step 419: determining whether to stop playing or not; and step 420: ending. In an instance that when the body interactively learning apparatus is used for English vocabulary recitation practice by a user, the user will first select the vocabulary recitation mode for the body interactively learning apparatus, and then the body interactively learning apparatus is enabled to access a question of a Chinese wording $Q_1$ to be used as a question from its data storage unit 15 as soon as its motion sensor 11 detects a specific body motion of the user and thus issues a vibration signal to the processing unit 11 where the signal is analyzed and determined to be valid, as the step 412 shown in FIG. 4 and the first question of FIG. 5.

Thereafter, the Chinese wording $Q_1$, e.g. is going to be enunciated by the use of the speaker 14 while allowing the user to respond with an English vocabulary corresponding to such Chinese wording $Q_1$, i.e. session, either by writing or by enunciation. After the user answered the question $Q_1$ and wants to know whether it is correct or not, or the user simply has no idea what the answer should be and wants to know the correct answer, he/she can perform another specific body motion, as the step 413 shown in FIG. 4, for enabling the motion sensor 12 to issue a valid vibration signal to the processing unit 11 so as to direct the processing unit 12 to access an English vocabulary $A_1$, which is the correct answer corresponding to the Chinese wording $Q_1$ as the step 414 shown in FIG. 4 and the first answer $A_1$ of FIG. 5. Thereafter, such English vocabulary $A_1$, i.e. session, will be enunciate by the speaker 14 by pronouncing the English vocabulary first and then followed by voicing its spelling, such as "session, s-e-s-s-i-o-n". As shown in FIG. 5, the timing when a first body motion triggers the motion sensor 15 to issue a valid vibration signal for initiating the body interactively learning apparatus to issue the Chinese wording $Q_1$ is marked as $M_1$, and the timing when a second body motion triggers the motion sensor 15 to issue another valid vibration signal for activating the body interactively learning apparatus to pronounce the corresponding answer $A_1$ to the $Q_1$ is marked as $M_2$, and if the user wants to continue the English vocabulary recitation practice and thus performs yet another body motion for activating the body interactively learning apparatus to issue a new question of Chinese wording $Q_2$, the timing of the third body motion is marked as $M_3$ while the timing for its answer $A_2$ is marked as $M_4$. The time interval $T_A$ measured between the playing of the first question $Q_1$ and the playing of the answer $A_1$ is going to be recorded and registered in the temporary-stored memory unit 16, as the step 415 shown in FIG. 4. It is noted that the practice of the first question $Q_1$ is complete right at the moment when the answer $A_1$ is played. However, when the repeat button of the keypad unit 18 is pressed after the completion of the first question $Q_1$, the third body motion $M_3$ will not trigger the body interactively learning apparatus to issue a new question of Chinese wording $Q_2$, but instead repeat the first question of Chinese wording $Q_1$ again, as the step 416 shown in FIG. 4. Such repetition is going to continue again and again until the repeat button is released.

On the other hand, if the user wants to continue the English vocabulary recitation practice, he/she will perform yet another valid body motion for activating the body interactively learning apparatus to access a question of a Chinese wording $Q_2$, e.g. 同意,to be used as a question from its data storage unit 15. Similarly, such question $Q_1$ is going to be enunciated by the use of the speaker 14 while allowing the user to respond with an English vocabulary corresponding to such Chinese wording $Q_2$, i.e. agree, either by writing or by enunciation. After the user answered the question $Q_1$ and wants to know whether it is correct or not, or the user simply has no idea what the answer should be and wants to know the correct answer, he/she can perform another specific body motion for enabling the motion sensor 12 to issue a valid vibration signal to the processing unit 11 so as to direct the processing unit 12 to access an English vocabulary $A_2$, which is the correct answer corresponding to the Chinese wording $Q_2$. Thereafter, such English vocabulary $A_2$, i.e. session, will be enunciate by the speaker 14 by pronouncing the English vocabulary $A_2$ first and then followed by voicing its spelling, such as "agree, a-g-r-e-e". It is noted that the time interval $T_A$ measured between the playing of the first question $Q_2$ and the playing of the answer $A_2$ is also going to be recorded and registered in the temporary-stored memory unit 16, and thus complete the practice of the second question. Thereby, the English vocabulary recitation practice is continued.

During the practice, the user is able to change the tempo of the questioning and answering by changing his/her body motion frequency according to his/her proficiency to the question, so that the difficulty of the practice can be adjusted at will for advance practicing. For instance, when the answering interval for the $N^{th}$ question is $T_{AN}$ and the user determines that he/she had known the question $Q_N$ well enough that he/she would like to perform a more advanced practice, he/she can intentional answer the $N+1^{th}$ question faster so shorting answering interval $T_{AN+1}$ for the $N+1^{th}$ question, i.e. $T_{AN+1} < T_{AN}$. Thereafter, as soon as the processing unit 11 detected that $T_{AN+1} < T_{AN}$, the body interactively learning apparatus is going to play the practice with a faster playing speed corresponding to $T_{AN+1}$, as the step 417 of FIG. 4. Thus, the playing of the $N+2^{th}$ question $Q_{N+2}$ as well as its answer $A_{N+2}$ will all be played by the faster playing speed through the speaker 14. Furthermore, as the time interval $T_Q$ between any two successive body motions is also recorded, the playing speed can also be accelerated by shortening the $T_Q$. Furthermore, as the shortening of the $T_Q$ can be enabled at will by the use, the difficulty of the practice using the same material can be adjust at will by the user while enabling the same to control the learning tempo at his/her own hand so that the confidence as well as the willingness of learning can be enhanced.

Second Exemplary Embodiment

Figure 6:
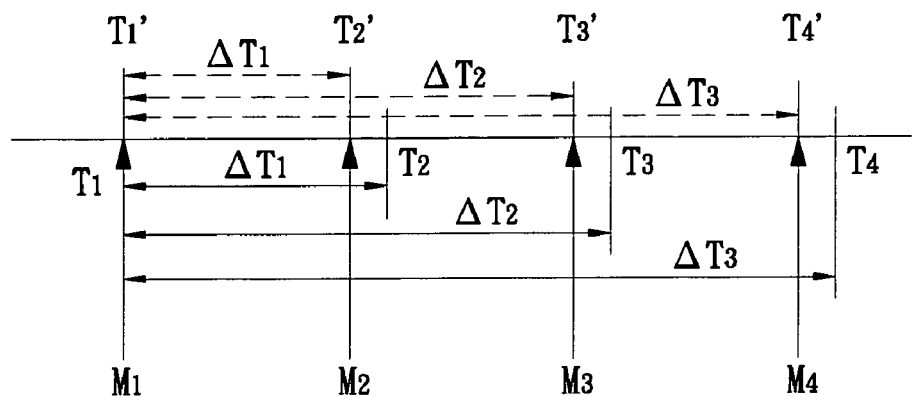
FIG. 6 is a schematic diagram showing the setup of timing used in a body interactively learning method for learning music according to an exemplary embodiment of the invention.

With reference to FIG. 1, FIG. 4, and FIG. 6, the second embodiment is adapted for learning music or a tempo. In this second embodiment, the processing unit will also selected an operation mode from the temporary-stored memory unit 16 suitable for music/tempo learning while using a display unit 13 for informing the user with current status, and the selection of the operation mode executed in the step 41 of FIG. 4 will direct the proceeding of FIG. 4 to the sub-proceeding starting from the step 421. The difference between the first embodiment and the second embodiment is that: the user is enabled to perform a learning process according to a fixed tempo. Such sub-proceeding can be considered as an music/tempo learning proceeding which includes the steps of: step 40: powering ON; step 41: selecting a mode; step 421: detecting body motions of a user; step 422: setting a time interval of music; step 423: playing music; step 424: comparing the time interval of music with a recorded time interval measured by detecting body motions of the user; step 425: determining whether or not to stop playing the music; step 426: calculating an error rate e; and step 427: displaying the error rate. In an instance that when the body interactively learning apparatus is used for learning music by a user, the user will first select the fixed tempo mode for the body interactively learning apparatus, and then the body interactively learning apparatus is enabled to access and play music that is to be learned from the data storage unit 15 as soon as its motion sensor 11 detects a specific body motion of the user and thus issues a vibration signal to the processing unit 11 where the signal is analyzed and determined to be valid, as the step 421 shown in FIG. 4. As shown in FIG. 6, the timing when the music starts is defined as $T_1$. When the music is played through the speaker 14, the user who is learning the music is supposed to perform body motions right at the designated meter points of the music which are going to be detected by the motion sensor 12. It is noted that each timing of the body motion will be registered, such as the timing of the first body motion $M_1$ is marked as $T_1$, and similar to those $M_2$, $M_3$ and $M_4$ of $T_2$, $T_3$ and $T_4$. In comparison, the timing for the correct meter point of the music is registered as $T_2'$, $T_3'$ and $T_4'$. Thereafter, the interval between $T_2$ and $T_1$ is calculated by the processing unit 11 as $\Delta T'=(T_2'-T_1)$ which is going to be compared with the correct interval measured as $\Delta T=(T_2'-T_1)$ so as to obtain an error rate, as the step 424 of FIG. 4. Thereafter, the processing unit 11 will perform an evaluation to determine whether the music is over, as the step 425 of FIG. 4; if not, the processing unit 11 will keep on comparing the next musical session for obtaining error rates; if so, the processing unit 11 is going to conclude the learning result of the user as an overall error rate by performing a calculation upon all the obtained error rates, as the step 426 shown in FIG. 4. Then, the overall error rate will be displayed on the display unit 13, as the step 427 of FIG. 4.

Third Exemplary Embodiment

In this third embodiment, an interactive mode is selected at the step 41 of FIG. 4 for direct the proceeding of FIG. 4 to the sub-proceeding starting from the step 431. Such sub-proceeding includes the steps of: step 40: powering ON; step 41: selecting a mode; step 431: playing a question; step 432: detecting body motions of a user; step 433: determining whether the body motions corresponding to the question are valid or not; step 434: informing the user that the body motions corresponding to the question are valid by a manner selected from the group consisting of: a light indication from a light display with function indicator, an audio reminder from an audio device, an image displaying from a display device, and the composition thereof; step 435: informing the user that the body motions corresponding to the question are invalid by a manner selected from the group consisting of: a light indication from a light display with function indicator, an audio reminder from an audio device, an image displaying from a display device, and the composition thereof; step 436: displaying the correct answer of the aforesaid question; step 437: updating the question; step 438: determining whether to stop playing or not; and step 439: ending. In an instance that when the body interactively learning apparatus is used for interactive learning such as in a interactive quiz show learning process and the interactive mode is selected by the step 41, the body interactively learning apparatus is enabled to access and play a data of quiz show that is to be learned from the data storage unit 15 while enabling the processing unit 11 to transmit the audios and videos of the quizzes from the accessed quiz data in an one-by-one manner to the display unit 13 and the speaker 14, as the step 431 shown in FIG. 4. Thereafter, the user is able to answer the quiz by his/her body motions. For instance, when the motion sensor is attached on the user's wrist while defining the swing of the wrist once to represent the user select the answer (A) for the quiz, and defining the swing of the wrist twice to represent the user select the answer (B) for the quiz, and so forth, the processing unit 12 is enabled to count the amount of the wrist swing, as the step 432 of FIG. 4, for evaluating the validity of the answer by comparing the counted amount with a predefined number of the quiz, as the step 433 of the FIG. 4. Thereafter, the result of the comparison is informed to the user by the use of the display unit 13 or the speaker 14 in a manner selected from the group consisting of: a light indication from a light display with function indicator, an audio reminder from an audio device, an image displaying from a display device, and the composition thereof. If the answer is not correct, not only such mistake is going to be informed to the user, but also the correct answer to the quiz will be shown to the user by the use of the display unit 13 and the speaker, as the step 436 of FIG. 4. Then, the next quiz of the accessed quiz data is provided to the user by the processing unit 11, as the step 437 of FIG. 4, until all the quiz in the data is answered or the user terminate the interactive mode by performing a specific body motion.

Fourth Exemplary Embodiment

Figure 7:
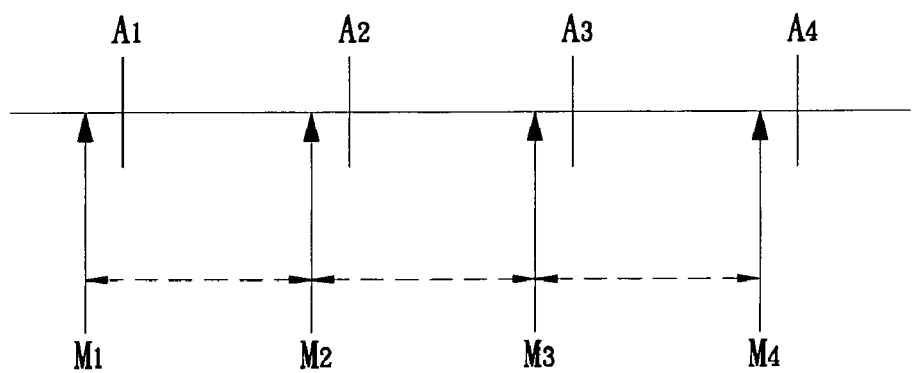
FIG. 7 is a schematic diagram showing the setup of timing used in an interactive Q&A method utilizing a body interactively learning apparatus of the invention.

Please refer to FIG. 1 and FIG. 7, which show a fourth exemplary embodiment of the invention. The fourth embodiment is adapted for practicing reading or writing of an article from memory. In an instance that when the body interactively learning apparatus is used for practicing silent reading on an article or for practicing the writing of an article from memory, the user will first select an operation mode corresponding to the silent reading/writing from memory for the body interactively learning apparatus, and then the body interactively learning apparatus is enabled to access the article from its data storage unit 15. After the user continues the recitation of memory to a specific session of the article or until a specific amount of characters is reached and the user would like to know the correctness of his/her recitation from memory up to the current point, the user will perform a specific body motion which is going to be detected by the motion sensor 12 for enabling the same to issue a vibration signal for directing the processing unit 11 to access a first answer $A_1$ corresponding to the current session from the data storage unit 15. Then the first answer $A_1$ is provided to the user in either an audio manner or video manner so as to be used for checking. After the checking is complete, the user will carry on the recitation the session next to the previous session until either the next session is done and ready for checking or the whole article is over. It is noted that the checking of the second session by the use of the second answer $A_2$ is performed similar to that of the first session, and so does to the third and fourth answer $A_3$ and $A_4$.

Figure 8:
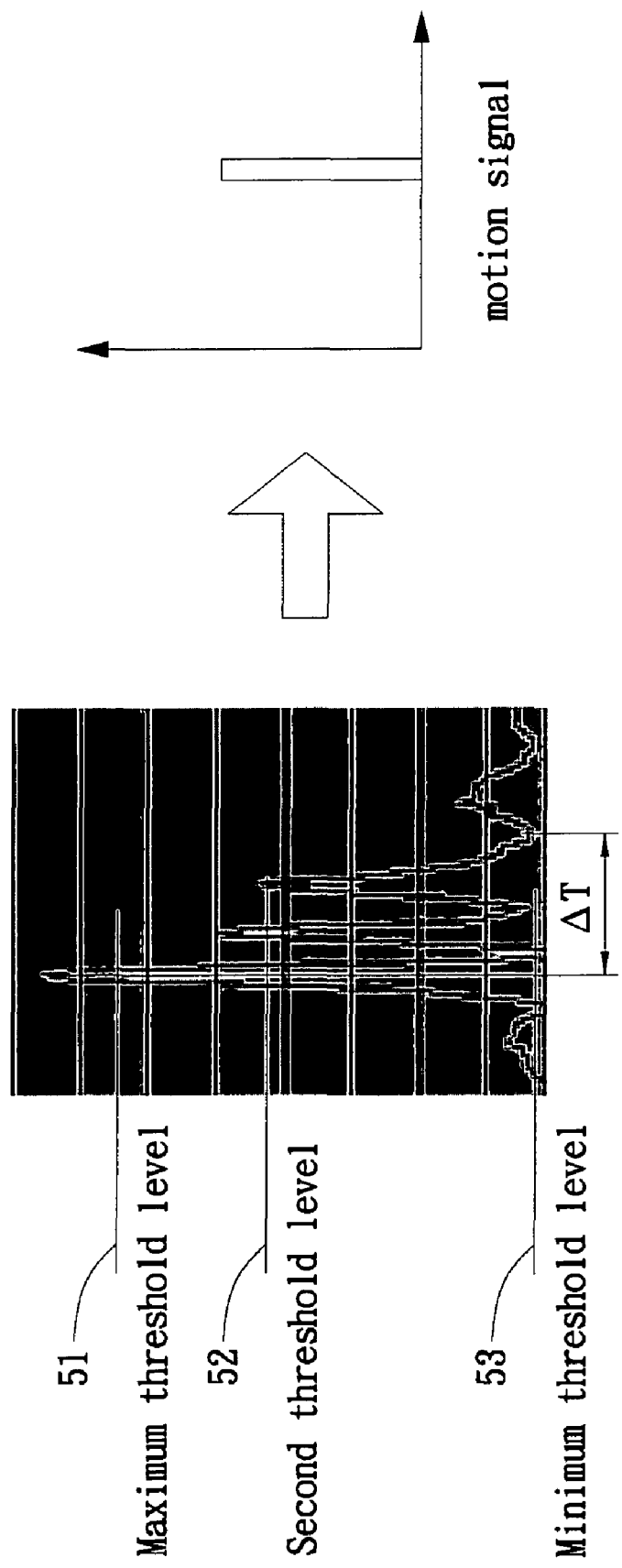
FIG. 8 shows how a motion sensor of a body interactively learning apparatus is configured for movement detection.

Please refer to FIG. 8, which shows how the motion sensor of a body interactively learning apparatus is configured for movement detection. When the motion sensor 12 is activated for detecting body motions of a user and thus sending corresponding vibration signals to the processing unit 11 for analysis, the processing unit 11 will initiate a time counting process as soon as it receives a vibration signal whose magnitude is larger than a predefined maximum threshold level 51. Moreover, in an exemplary embodiment, by defining a specific duration $\Delta T$ for the time counting process to last while making an evaluation to determine whether there is N vibration signals whose magnitudes are larger than a second threshold level 52 and n vibration signals whose magnitudes are smaller than a minimum threshold level 53, the processing unit will conclude that there is one valid body motion executed so as to activate the body interactively learning apparatus to operate accordingly with respect to the selected operation mode thereof. Thus, By the aforesaid vibration signal analysis, the processing unit 11 is able to determine whether the body motion is valid or not and thus direct the body interactively learning apparatus to operate accordingly that mistake caused by any unintentional body motion can be avoided so as to ensure a smooth learning process to be performed on the body interactively learning apparatus.

Figure 9:
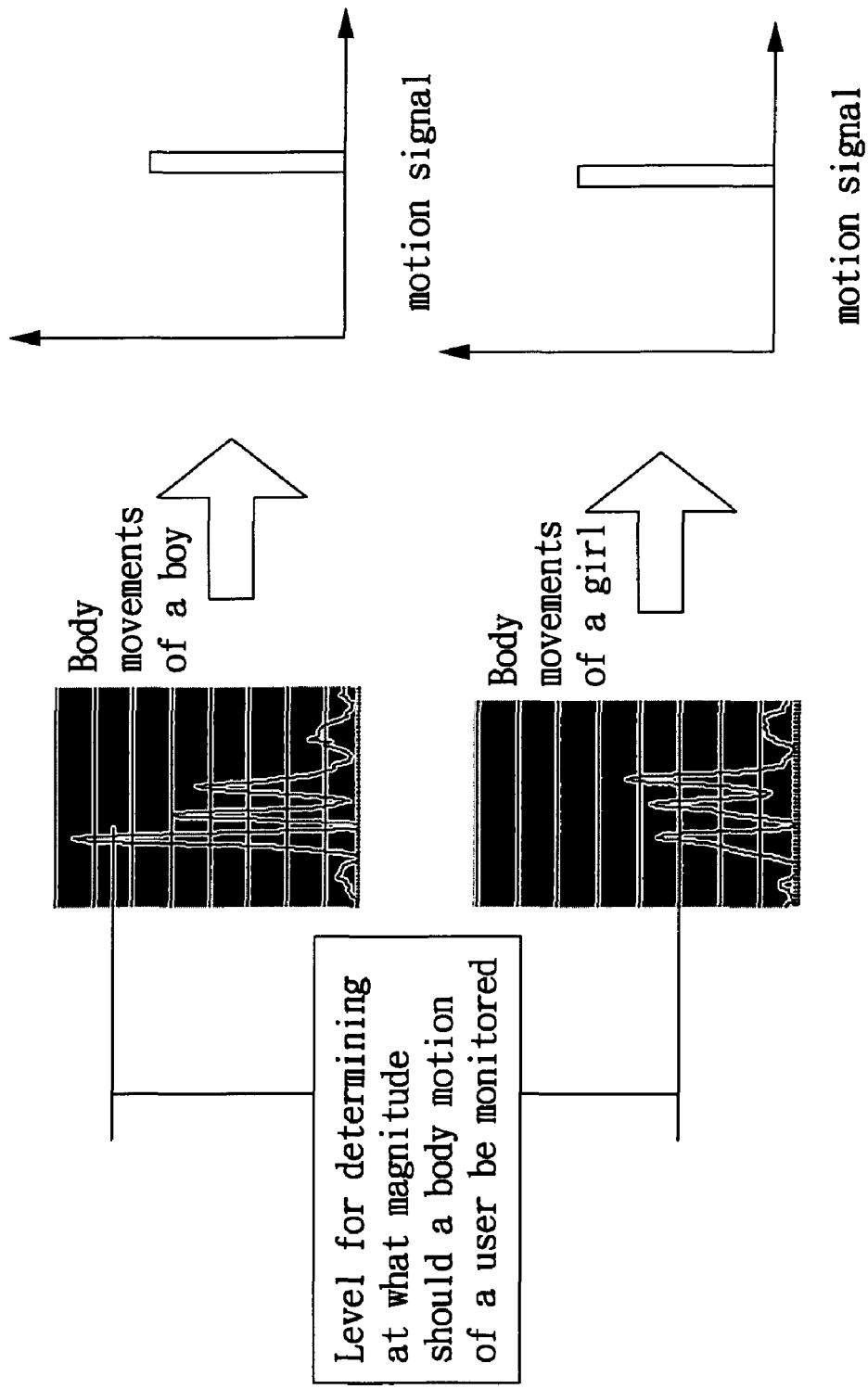
FIG. 9 shows how the sensitivity of a motion sensor is configured by the use of a magnitude level adjusting unit so as to adapt the same for different users.

Please refer to FIG. 9, which shows how the sensitivity of a motion sensor is configured by the use of a magnitude level adjusting unit so as to adapt the same for different users. In an exemplary embodiment, the sensitivity of the body interactively learning apparatus is configured to be adjustable by the use of a magnitude level adjusting unit, so that the sensitivity of the body interactively learning apparatus can be adjusted for adapting the same to be used by different users, especially for users of different genders and age groups. For instance, it is a common sense that the vibrating magnitudes of body motions caused by male are not the same as those caused by female, therefore, if there is a magnitude level adjusting unit configured in the body interactively learning apparatus to be used for custom-designing the maximum threshold level for any individual using the body interactively learning apparatus, each and every user is able to operate the body interactively learning apparatus easily and comfortable without having to learn how to perform one's body motion so as to be detected by the motion sensor correctly. In FIG. 9, since males are usually stronger than females, the maximum threshold level for male is usually being adjusted in a manner that it is higher than that for female so that the result of body motions detected by the body interactively learning apparatus will be about the same no matter it is exerted by a boy or a girl.

From the above description, it is known that the maximum threshold level can be adjusted directly by the user controlling the magnitude level adjusting unit. However, when there are constant vibrations existed in the ambient environment of an operating body interactively learning apparatus, the magnitude level adjusting unit can be activated automatically or manual for raising the maximum threshold level so as to preventing the operation of the body interactively learning apparatus to be affected by the ambient vibrations. Thus, by the magnitude level adjusting unit, not only any user is able to operate the magnitude level adjusting unit easily and comfortable, but also it can help preventing the body interactively learning apparatus from being adversely affected by ambient noises and vibrations.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A body interactively learning method, comprising the steps of:
   (A) turning on the power of a body interactively learning apparatus and selecting an operation mode;
   (B) attaching a motion sensor of the body interactively learning apparatus onto a user;
   (C) using the motion sensor to detect vibrations of the user's body and consequently sending the detected vibration signals to a processing unit, initiating a time counting process when a vibration signal is received by the processing unit having a larger magnitude than a predefined maximum threshold level, and defining a specific duration for the time counting process to last while actively determining whether a first number of vibration signals have magnitudes larger than a second threshold level and a second number of vibration signals have magnitudes smaller than a minimum threshold level;
   (D) enabling the processing unit to perform an evaluation for determining whether the vibration signals are valid; if so, go to step (E); otherwise, go back to step (C);
   (E) enabling the user to use the valid vibration signals for controlling a proceeding of an audio/video content that is stored in a data storage unit of the apparatus selected from the group consisting of: playing the audio/video content, pausing the playing of the audio/video content, recording the audio/video content, setting pause points in the audio/video content, searching the pause points of the audio/video content, and changing playing speed of the audio/video content, or for responding interactively to the audio/video content;
   (F) determining whether the user goes back to step (C) or stops the playing of the audio/video content by performing an action selected from the group consisting of: pressing a stop button of the body interactively learning apparatus, and generating a specific vibration signal indicating stop playing; and
   (G) ending;
   wherein the user can use a magnitude level adjusting unit to adjust the maximum threshold level of vibration signal to get valid vibration signal for different users or for different environment when learning.

2. The body interactively learning method of claim 1, wherein the interactively learning apparatus is a portable device.

3. The body interactively learning method of claim 1, wherein the power source of the body interactively learning apparatus is a source selected from the group consisting of a battery and a solar power source.

4. The body interactively learning method of claim 1, wherein the motion sensor is a device selected from the group consisting of: a sensor configured inside the body interactively learning apparatus, and an independent sensor or several independent sensors connecting to the body interactively learning apparatus by a means selected between a wired means and a wireless means.

5. The body interactively learning method of claim 1, wherein the motion sensor is adapted to be attached to a body portion of the user selected from the group consisting of the two hands, the two arms, the two legs, the waist and the head thereof.

6. The body interactively learning method of claim 1, wherein the audio/video content is composed of at least a file selected from the group consisting of an audio data and a video data.

7. The body interactively learning method of claim 1, wherein the audio/video content is capable of being transmitted to a device selected from the group consisting of an external data process unit and another body interactively learning apparatus by the use of a data transmission unit configured in the body interactively learning apparatus.

8. The body interactively learning method of claim 1, wherein the recording of the audio/video content executed in the step (E) is performed by a process comprising the steps of:
   enabling the user to activate the recording of the audio/video content by a specific body motion or pressing a recording button;
   setting up several pause points during the recording of the audio/video content by another specific body motions in a manner that the body interactively learning apparatus playing the recorded audio/video content is paused as soon as the playing reaches any of the pause points;
   enabling the user to use a repeat button with a specific body motion to repeat the playing of the portion of the audio/video content that is recorded between a current pause point and another pause point previous to the current pause point; and
   enabling the user to use a specific body motion to initiate the playing of the portion of the audio/video content that is recorded between the current pause point and another pause point next to the current pause point.

9. The body interactively learning method of claim 1, wherein the setting of pause points executed in the step (E) is enabled for the audio/video content during recording or during playing by the user's body motion.

10. The body interactively learning method of claim 1, wherein the searching of the pause point of the audio/video content executed in the step (E) is performed in a manner selected from the group consisting of: enabling the user to execute a specific body motion for activating a forward searching operation until a specific pause point is achieved; enabling the user to execute a specific body motion for activating a backward searching operation until a specific pause point is achieved; and inputting a serial number corresponding to a specific pause point by the use of a keypad unit so as to play the audio/video content from the specific pause point.

11. The body interactively learning method of claim 1, wherein the changing of playing speed of the audio/video content executed in the step (E) is performed in a manner that the playing speed of the audio/video content is adjusted according to the time interval measured between two body motions of the user.

12. The body interactively learning method of claim 1, wherein the user is able to use a repeat button to repeat the playing of any portion of the audio/video content.

13. The body interactively learning method of claim 1, wherein the audio/video content is outputted by a device selected from the group consisting of: a display device and a speaker.

14. The body interactively learning method of claim 13, wherein the display device is a device selected from the group consisting of: a LED, a LCD displayer, a LED displayer, a plasma displayer, and a CRT displayer.

15. The body interactively learning method of claim 1, capable of being adapted for learning a skill selected from the group consisting of: language, music and rhythm.

16. The body interactively learning method of claim 1, capable of being adapted for learning a skill selected from the group consisting of: language, music, rhythm, and any knowledge capable of being learned by memorizing.

17. The body interactively learning method of claim 1, wherein the motion sensor is a device selected from the group consisting of: an accelerometer, a gyroscope, a force sensor, a displacement sensor and a mechanical vibration sensor.

18. A language-learning method utilizing a body interactively learning apparatus comprising the steps of:
(A1) turning on the power of a body interactively learning apparatus and attaching a motion sensor of the body interactively learning apparatus onto a user;
(A2) selecting an operating mode;
(A3) detecting body motions of the user by detecting vibration signals, initiating a time counting process when a vibration signal is detected having a larger magnitude than a predefined maximum threshold level, and defining a specific duration for the time counting process to last while actively determining whether a first number of vibration signals have magnitudes larger than a second threshold level and a second number of vibration signals have magnitudes smaller than a minimum threshold level;
(A4) playing a question;
(A5) detecting body motions of the user;
(A6) playing an answer relating to the question;
(A7) recording the time interval measured between the two detections of the body motions of the user;
(A8) determining whether to repeat the aforesaid question; if so, go back to step (A4); otherwise, go to step (A9);
(A9) selecting a playing speed according to the time interval from step (A7), enabling the user to control the tempo of an audio/video content playing on the body interactively learning apparatus by adjusting the tempo of his/her motions;
(A10) updating the question;
(A11) determining whether the user stops the playing by performing an action selected from the group consisting of: pressing a stop button of the body interactively learning apparatus, and generating a specific vibration signal indicating stop playing; if so, go to step (A12); otherwise, go to the step (A3) so as to get ready to play the updated question according to the playing speed selected from the step (A9); and
(A12) ending;
wherein the user can use a magnitude level adjusting unit to adjust the maximum threshold level of vibration signal to get valid vibration signal for different users or for different environment when learning.

19. The language-learning method of claim 18, wherein the detection of body motions executed in any one of the step (A3) and the step (A5) is performed by the use of a device selected from the group consisting of: an accelerometer, a gyroscope, a force sensor, a displacement sensor and a mechanical vibration sensor.

20. A music-learning method utilizing a body interactively learning apparatus comprising the steps of:
(B1) turning on the power of a body interactively learning apparatus and attaching a motion sensor of the body interactively learning apparatus onto a user;
(B2) selecting an operating mode;
(B3) detecting body motions of the user by detecting vibration signals, initiating a time counting process when a vibration signal is detected having a larger magnitude than a predefined maximum threshold level, and defining specific duration for the time counting process to last while actively determining whether a first number of vibration signals have magnitudes larger than a second threshold level and a second number of vibration signals have magnitudes smaller than a minimum threshold level;
(B4) setting up a time interval of the music;
(B5) playing music;
(B6) comparing the time interval of the music with a recorded time interval measured by detecting body motions of the user;
(B7) making an evaluation to determining whether one of the following condition is happened: the music is over, and the user stops the playing of the music by pressing a stop button of the body interactively learning apparatus or by generating a specific vibration signal; if so, go to step (B8); otherwise, go back to step (B3);
(B8) calculating an error rate according to the comparison executed in the step (B6); and
(B9) displaying the error rate;
wherein the user can use a magnitude level adjusting unit to adjust the maximum threshold level of vibration signal to get valid vibration signal for different users or for different environment when learning.

21. The music-learning method of claim 20, wherein the detection of body motions executed in the step (B3) is performed by the use of a device selected from the group consisting of: an accelerometer, a gyroscope, a force sensor, a displacement sensor and a mechanical vibration sensor.

22. A Q&A learning method utilizing a body interactively learning apparatus comprising the steps of:
(C1) turning on the power of a body interactively learning apparatus and attaching a motion sensor of the interactively learning apparatus onto a user;
(C2) selecting an operating mode;
(C3) playing a question;
(C4) detecting body motions of a user by detecting vibration signals, initiating a time counting process when a vibration signal is detected having a larger magnitude than a predefined maximum threshold level, and defining a specific duration for the time counting process to last while actively determining whether a first number of vibration signals have magnitudes larger than a second threshold level and a second number of vibration signals have magnitudes smaller than a minimum threshold level;

(C5) making an evaluation for determining whether the body motions corresponding to the question are valid or not; if so, go to step (C6); otherwise, go back to step (C7);

(C6) informing the user that the body motions corresponding to the question are valid by an audio/video means and then go to step (C9);

(C7) informing the user that the body motions corresponding to the question are invalid by an audio/video means and then go to step (C8);

(C8) displaying the correct answer of the aforesaid question;

(C9) updating the question;

(C10) determining whether the user stops the playing by performing an action selected from the group consisting of: pressing a stop button of the body interactively learning apparatus, and generating a specific vibration signal indicating stop playing; if so, go to step (C11); otherwise, go back to the step (C3) so as to get ready to play the updated question; and (C11) ending;

wherein the user can use a magnitude level adjusting unit to adjust the maximum threshold level of vibration signal to get valid vibration signal for different users or for different environment when learning.

23. The Q&A learning method of claim 22, wherein the detection of body motions executed in the step (C4) is performed by the use of a device selected from the group consisting of: an accelerometer, a gyroscope, a force sensor, a displacement sensor and a mechanical vibration sensor.

24. The Q&A learning method of claim 22, wherein the evaluation for determining whether the body motions corresponding to the question are valid or not in the step (C5) is performed in a manner selected from the group consisting of: counting the times of body motions performed by the user while evaluating the validity of the answer by comparing the counted amount with a predefined number; recognizing a gesture from the detected body motions while evaluating the validity of the answer by comparing the gesture with a predefined gesture; and comparing the sequence of the detected body motions with a predefined sequence for evaluating the validity of the answer.

25. The Q&A learning method of claim 22, wherein the audio/video means used in step (C6) and the step (C7) is able to inform the user by a manner selected from the group consisting of: a light indication from a light display with function indicator, an audio reminder from an audio device, an image displaying from a display device, and the composition thereof.

26. The Q&A learning method of claim 22, wherein the displaying of the correct answer of the aforesaid question executed in the step (C8) is performed by a manner selected from the group consisting of: an audio reminder from an audio device, an image displaying from a display device, and the composition thereof.

* * * * *